March 17, 1953 W. H. GILSON 2,631,567
POULTRY FEEDER
Filed July 10, 1948

INVENTOR.
WALTER H. GILSON
BY
Miles Kenninger
ATTORNEY

Patented Mar. 17, 1953

2,631,567

UNITED STATES PATENT OFFICE 2,631,567

POULTRY FEEDER

Walter Herman Gilson, Reedsburg, Wis.

Application July 10, 1948, Serial No. 38,030

3 Claims. (Cl. 119—53)

This invention relates to improvements in devices for feeding poultry and particularly to a storage type feeder applicable to feeding both grain and mash.

The proper feeding of poultry of various kinds requires the use of large quantities both of whole and partly ground grain, and of "mash" which may include partly ground grain, by-products such as middlings obtained in the milling of wheat, etc., and various supplements which may be either powdered or liquid. Other materials must be fed in smaller quantities and do not require any material amount of labor for keeping up the supply. For the feeding of grain and, particularly of mash, poultry growers desire a device in which large quantities of such materials may be placed at one time and which will bring the feed to a place from which the poultry may feed without dirtying or wasting the feed and until substantially all of the feed is consumed.

Grain and mash have such different flow characteristics that no one has heretofore been able to produce a storage type poultry feeder which could be successfully used for both types of feed without wasting feed, or clogging and requiring the poultry grower's attention for continued use, before all the feed was consumed. Nor has a storage type feeder been heretofore made in which all of the feed components are available to the poultry at the same place thus obtaining a balanced feeding of the poultry.

It is, therefore, one object of the present invention to provide a storage type feeder which may be used with various kinds of feed for poultry and which will not require any attention by the poultry grower between fillings.

Another object of the invention is to provide a storage type feeder for poultry, which is simply and quickly adjustable to operate in the same manner with feeds having different flow characteristics.

Another object of the invention is to provide a storage type feeder for poultry which will present the feed at substantially the same place regardless of the feed flow characteristics and so long as more than a given minimum quantity of feed is present in the device.

A further object of the invention is to provide a storage type feeder which will be substantially emptied by the poultry and in which all of the feeding components are present at the same location thereby securing balanced feeding by the poultry.

And a further object of the invention is to provide a storage type poultry feeder in which the feed cannot be dirtied by the poultry, from which the feed will not be wasted and which cannot be used by the poultry for roosting purposes.

Objects and advantages other than those above set forth will be apparent from the following description when read in connection with the accompanying drawing illustrating one embodiment of the invention, and in which.

Figure 1:
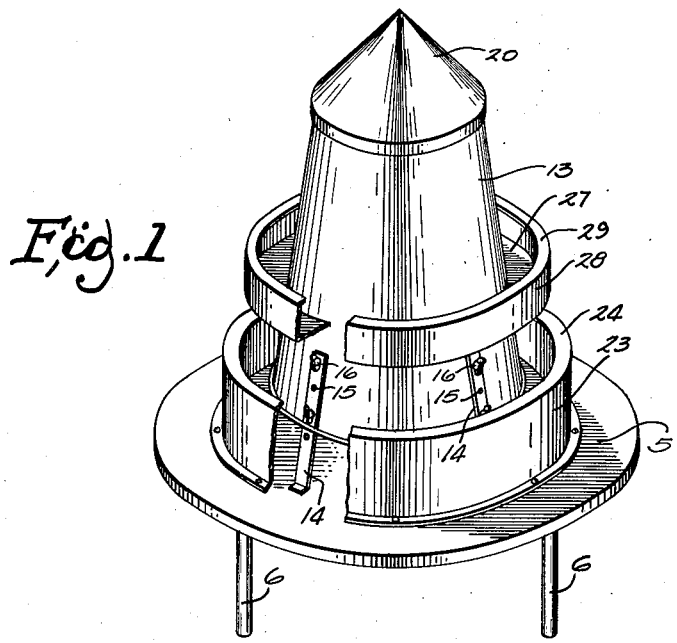
Fig. 1 is an elevation of the completed structure, with portions broken away.

Generally, the present feeder comprises a platform supported above ground level and having a cone mounted thereon which is to be partially enclosed by a frusto-conical hollow hopper supported substantially concentrically with the cone but with the base of the hopper raised from the platform and with the upper end of the hopper closed by a conical cover. A substantially cylindrical collar is fixed on the platform concentrically with the cone and the hopper, and the platform is preferably circular with the periphery thereof substantially parallel with one surface of the collar.

The base diameter and altitude of the cone are related to each other and may be varied only within a relatively small range. The lower base diameter of the hopper is in a given relation to the base diameter of the cone but the hopper altitude may be as desired provided the upper opening is sufficient in size for convenient filling of the hopper but the cone and hopper wall should be substantially concentric. The base of the hopper is spaced above the platform by a distance dependent upon the flow characteristics of the material being fed.

The collar is spaced from the vertical projection of the hopper base on the platform, by a distance not less than the maximum height of the hopper base above the platform and is preferably more than two times the height of such hopper base height above the platform. The collar height is such as to bring the upper edge thereof above the base of the hopper at all times. The collar is so formed relative to the hopper wall that the poultry cannot roost on the collar and dirty the feed inside the collar. The edge of the platform extends beyond the collar a sufficient distance for poultry to stand but is too narrow for roosting and no surfaces whatever of the feeder can be used by the poultry for roosting purposes.

Referring more particularly to the drawings, a platform 5 of circular shape is supported on legs 6 of a height such that poultry can and must hop on the platform for access to the feed which limits the number of poultry feeding at any one time and hence aids in minimizing wastage of feed. The legs supporting the platform are metallic and are not climbable by rats or other vermin, and are of such height as to make it at least difficult for rats to jump to the platform. A hollow cone 10 is fixed centrally on the platform, the cone having a ratio (see Fig. 3) of base diameter A to altitude B ranging from 1:2.2 to 3. Such ratio is one of the features essential to the proper operation of the feeder for use with materials having different flow characteristics and gives the cone wall an angle above the angle of repose of any material now in use for poultry feeding.

A frusto-conical hopper 13 is supported with its larger base above the platform and concentrically with the cone, on legs 14. The hopper legs are provided with a plurality of holes 15 and are fastened to the hopper by bolts with thumb nuts 16 for adjusting the height of the hopper base above the platform dependent on the material being fed. For the most practical structure, the lower hopper base diameter C is so dimensioned that the ratio of A to C ranges from 1:2.4 to 3, the higher value being preferred. The hopper wall is at substantially the same angle as the cone wall so that the different walls defining the storage space, are approximately parallel and produce a space of substantially equal area at any horizontal place through the hopper. The altitude E of the hopper may be varied subject only to the retention of an opening sufficient for convenient filling and such opening is closed by a conical cover 20.

The distance F between the platform and the lower edge of the hopper is related to both the base diameter of the cone and the flow characteristics of the material being fed, and such distance F should be approximately two inches for whole grain and approximately four inches for mash to provide an opening through which only the desired quantity of feed will flow regardless of the quantity of feed in the hopper above the lower edge thereof. It will be understood that F is varied as required and may be less than two inches or more than four inches depending entirely on the particle size, dryness and surface conditions, etc., of the material to be fed.

A collar 23 is made in substantially hollow cylindrical form and is placed on the platform concentrically with the cone 10, the collar having an inturned flange 24 at the upper edge thereof. The collar diameter C, C plus G, G is preferably greater than the hopper base diameter C, C by not less than two times the maximum spacing F of the hopper edge above the platform, thus providing a feed surface accessible to poultry about the entire hopper edge and of adequate width for poultry feeding therefrom. The height H of the collar is such that the flange is always at least substantially above a horizontal plane through the base edge of the hopper for any hopper position and above the top of the body of poultry standing on the base so that the poultry must reach up and over the flange for feeding. The flange is of such width that feed accidentally raised from the feeding surface is likely to be deflected downwardly by the flange and that it is impossible for average size poultry to grip the flange with their feet. Such flange width plus the fact that the space between the collar upper edge and the hopper wall is relatively short, prevents roosting and aids in keeping the feed clean.

A substantially annular shelf is formed by a bottom 27 and a vertical wall 28 with an inturned flange 29 to provide one or more compartments in which such supplementary materials as oyster-shell, grit or other feed supplements may be placed, such materials being required only in small quantities. But such shelf makes all supplementary feed components available in one place and has an important result as will appear herein. The width of flange 29 and its relation to the hopper wall, are as described above relative to collar 23.

Figures 2, 3:
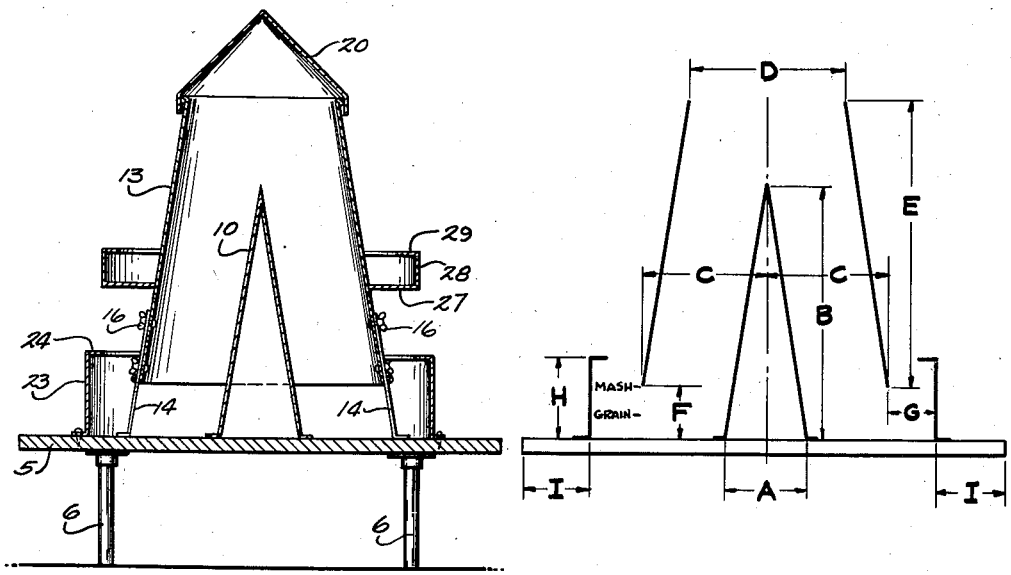
Fig. 2 is a cross-sectional view on a central vertical plane through Fig. 1.
Fig. 3 is a diagram of the proportions of the various parts and the relations between such parts.

Referring now to Fig. 3, the various dimensions of the several elements of the present structure are designated by various letters, the cone base diameter being designated A and the cone altitude being B. The hopper larger base diameter is designated C—C and its smaller base diameter is designated D, while its altitude is designated E and the spacing of the hopper base above the platform is designated F. The collar spacing from the vertical projection of the lower hopper edge on the platform is designated G, while the height of the collar is designated H. The width of the platform outside of the collar is designated I.

The following table shows actual dimensions and important ratios of such dimensions, in inches, of feeders of various sizes which have proved to be the best for various sizes of poultry flocks:

| A | B | A:B | C | A:C | D | E |
|---|---|---|---|---|---|---|
| 6 | 18 | 1:3 | 18 | 1:3 | 14 | 19 |
| 8 | 20 | 1:2.5 | 20 | 1:2.5 | 16 | 21 |
| 10 | 22 | 1:2.2 | 24 | 1:2.4 | 20 | 23 |

It will thus be seen that ratio A—B varies from 1:1.22 to 1:3 and the ratio of A—C varies from 1:2.4 to 1:3. F varies between two and four inches for grain and mash type feeds respectively. Higher ratios of $A:B$ are useless as the angle of the cone wall is already above the angle of repose of the less fluid material to be fed, and ratios lower than 1:2 produce such cone wall angle that the feed will not flow freely. If the ratio $A:C$ is greater than the above maximum value, there will be less feed left in the "ring" around the base of the cone and not accessible to poultry while if such ratio is less than that given above, the various feeds will no longer flow freely. The values of F are given for the two most common poultry feeds, feeds of different flow characteristics requiring values approaching the above values in the same relation as the flow characteristics of such different feeds bear to those of grain and mash. G, is 4 inches, H, is 6 inches and I is 5 inches for chickens but such values are increased if the feeder is to be used for larger fowl. G should be at least equal to the maximum value of F and I is such that the particular kind of poultry being fed, cannot roost on the platform.

It will thus be seen that the present structure provides a poultry feeder which meets poultry growers requirements for adequate storage space to increase the period between refillings, and to avoid clogging so that no attention whatever need be given to the feeder between fillings. The feeder is substantially completely emptied by the poultry thus making the maximum storage capacity usable and also minimizing the "stale" feed to be moved toward the feeding location by the poultry grower upon refilling of the feeder. There is no waste of the feed for any reason whatever and all of the feed components are available in the same location thus contributing to balanced feeding by the poultry and minimizing the work of replenishing the supply of feed.

The "no-clogging" action is secured by making the angle of the cone and hopper walls greater than the angle of repose for the least fluid feed and substantially parallel to avoid "stagnant" areas in the feed and avoid so-called "bridging" of the feed. The hopper is spaced above the base so that the feed flows freely toward the collar and the collar dimensions are such that adequate feeding space is provided regardless of the flow characteristics of the feed.

The quantity of feed adjacent the cone and inaccessible to poultry is kept at a low value. Wastage during feeding is kept to the minimum and the poultry cannot roost on or assume such position on the feeder that they can dirty the feed. The feeding of poultry is thus reduced to a periodic refilling of the hopper dependent on the size of the flock and the setting of the device for different feeds is reduced to shifting of a few bolts.

Although but one embodiment of the present invention has been illustrated and described, it will be apparent to those skilled in the art that various changes and modifications may be made therein without departing from the spirit of the invention or from the scope of the appended claims.

I claim:

1. A poultry feeder comprising a platform, legs supporting the platform above ground level, a cone mounted on the platform, a frusto-conical hopper larger than the cone, the hopper bottom diameter being in a ratio to the cone base diameter ranging from 2.4:1 to 3:1, the hopper having approximately the shape of the cone and being arranged substantially concentrically therewith and being raised above the platform, and a collar mounted on the platform and extending in spaced relation with and about the end of the hopper, and with the hopper bottom edge supported above the platform from 2 to 4 inches depending on the flow characteristics and the angle of repose of the feed.

2. A poultry feeder comprising a platform, means attached to the bottom of the platform, for supporting the same above ground level, a cone fixed on the platform, a hollow frusto-conical hopper adjustably supported in spaced relation above the platform and having its wall extending in spaced relation with and above the cone, the cone and the hopper defining a chamber for receiving a supply of feed, a conical cover for closing the upper end of the hopper, and a collar fixed on the platform concentrically with and spaced from the periphery thereof and surrounding the cone below the lower edge of the hopper and surrounding the lower portion of the hopper in spaced relation for coacting with the cone and the hopper in forming an open-top receptacle for feed flowing from the hopper, the platform having a portion extending outwardly from the collar to form a ledge for poultry to stand thereon.

3. A poultry feeder as defined in claim 2, with the hopper bottom diameter in a ratio to the cone base diameter ranging from 2.4:1 to 3:1 and with the hopper bottom edge supported above the platform from 2 to 4 inches depending on the flow characteristics and the angle of repose of the feed.

WALTER HERMAN GILSON.

REFERENCES CITED

The following references are of record in the file of this patent:

UNITED STATES PATENTS

| Number | Name | Date |
|---|---|---|
| 582,410 | Young | May 11, 1897 |
| 776,912 | Howard | Dec. 6, 1904 |
| 900,851 | Hatch | Oct. 13, 1908 |
| 985,201 | Owens | Feb. 28, 1911 |
| 1,113,887 | Dragan et al. | Oct. 13, 1914 |
| 1,132,973 | Rappleye | Mar. 23, 1915 |
| 1,154,073 | Stocking | Sept. 21, 1915 |
| 1,200,892 | Shiffer | Oct. 10, 1916 |
| 1,282,092 | Lieber | Oct. 22, 1918 |
| 1,301,027 | Barnes | Apr. 15, 1919 |
| 1,450,175 | Honsinger | Apr. 3, 1923 |
| 1,468,205 | Julian | Sept. 18, 1923 |
| 1,468,668 | Mitchell | Sept. 25, 1923 |
| 1,527,360 | Harless | Feb. 24, 1925 |
| 1,534,375 | Foucht | Apr. 21, 1925 |
| 1,601,030 | Love | Sept. 28, 1926 |
| 1,610,614 | McCollough | Dec. 14, 1926 |
| 1,623,840 | Kassy | Apr. 5, 1927 |
| 1,649,250 | Patterson | Nov. 15, 1927 |
| 2,273,616 | Beatty | Feb. 17, 1942 |
| 2,515,698 | Cosby | July 18, 1950 |

FOREIGN PATENTS

| Number | Country | Date |
|---|---|---|
| 138,455 | Great Britain | Feb. 12, 1920 |
| 206,561 | Great Britain | Nov. 15, 1928 |